United States Patent [19]

Sasaki et al.

[11] Patent Number: 4,933,081
[45] Date of Patent: Jun. 12, 1990

[54] ASYMMETRIC MICRO-POROUS MEMBRANE CONTAINING A LAYER OF MINIMUM SIZE PORES BELOW THE SURFACE THEREOF

[75] Inventors: Jun Sasaki; Kyoichi Naruo, both of Kanagawa, Japan

[73] Assignee: Fuji Photo Film Co., Ltd., Kanagawa, Japan

[21] Appl. No.: 889,708

[22] Filed: Jul. 28, 1986

[30] Foreign Application Priority Data

Jul. 27, 1985 [JP] Japan .................. 60-166984

[51] Int. Cl.$^5$ .................................. B01D 13/00
[52] U.S. Cl. .................. 210/490; 210/500.41; 364/41
[58] Field of Search .............. 210/500.38, 500.27, 210/500.41, 490; 55/158; 428/315.5, 315.7, 315.9; 264/41; 427/244, 245, 246

[56] References Cited

U.S. PATENT DOCUMENTS

| | | | |
|---|---|---|---|
| 1,421,341 | 6/1922 | Zsigmondy et al. | 210/500.29 |
| 2,783,894 | 3/1957 | Lovell et al. | 210/500.38 |
| 2,944,017 | 7/1960 | Cotton | 210/500.38 |
| 3,133,132 | 5/1964 | Loeb et al. | 210/500.3 X |
| 3,408,315 | 10/1968 | Paine | 264/49 |
| 4,196,070 | 4/1980 | Chao et al. | 204/266 |
| 4,340,479 | 7/1982 | Pall | 210/500.33 X |
| 4,340,480 | 7/1982 | Pall et al. | 210/500.38 X |
| 4,340,482 | 7/1982 | Sternberg | 210/500.37 |
| 4,388,189 | 6/1983 | Kawaguchi et al. | 210/500.38 X |
| 4,450,126 | 5/1984 | Kesting | 264/41 |
| 4,547,289 | 10/1985 | Okano et al. | 210/652 |

*Primary Examiner*—Frank Spear
*Attorney, Agent, or Firm*—Sughrue, Mion, Zinn, Macpeak & Seas

[57] ABSTRACT

A new micro-porous membrane having a layer of minimum pores inside is disclosed. This membrane can be produced by a kind of dry-wet method in which a gas is in contact with the surface of the spread solution before it is immersed in a solidifying bath to form a coacervation phase only in the surface layer of the spread solution. It is quite important to control the amount of non-solvent for a utilized polymer contained in the gas as well as a blowing rate of the gas toward the above mentioned surface. The micro-porous membrane of the present invention not only has an improved filtration flow rate and life as a filter, but also the risk of being damaged by scratches is minimized.

6 Claims, 1 Drawing Sheet

X1500

ASYMMETRIC MICRO-POROUS MEMBRANE CONTAINING A LAYER OF MINIMUM SIZE PORES BELOW THE SURFACE THEREOF

BACKGROUND OF THE INVENTION

1. Field of the Invention

The present invention relates to an asymmetric micro-porous membrane. More particularly, it relates to a micro-porous membrane having a small filtration resistance.

2. Prior Art of the Invention

Micro-porous membranes have been known for quite a long time (For example, "Synthetic Polymer Membranes" written by R. Kesting and published by McGraw Hill Co.) and widely used for filtration, etc. They are produced by using cellulose esters as starting materials as described in U.S. Pat. Nos. 1,421,341, 3,133,132 & 2,944,017, and Japanese Patent Publication Nos. 15698/68, 33313/70, 39586/73 & 40050/73, by using aliphatic polyamides as described in U.S. Pat. Nos. 2,783,894, 3,408,315, 4,340,479, 4,340,480 & 4,450,126, and German Patent No. 3,138,525, by using polyfluorocarbons as disclosed in U.S. Pat. Nos. 4,196,070, & 4,340,482, and Japanese Patent Publication (OPI) Nos. 99934/80 & 91732/83 (the term "OPI" as used herein means an "unexamined published application"), by using polysulfones as shown in Japanese Patent Publication (OPI) Nos. 154,051/81 and 86,941/81, and employing polypropylene as shown German Patent OLS 3,003,400. These micro-porous membranes are used for e.g., filtering or sterilizing cleaning water for the electronic industry, water for medicines including that used in their manufacturing processes, water for foodstuffs, etc. The uses of the membrane and their quantity consumed are increasing recently. Especialy, highly reliable micro-porous membrane are used a lot and attracting attention from the viewpoint of catching fine particles.

Such micro-porous membranes are divided into two groups, i.e., (1) the so-called symmetric membrane: the micro-pores in this membrane have diammeters which substantially do not vary in the direction of its thickness and those on both sides of its have substantially the same diameter, and (2) the so-called asymmetric membrane: its micro-pores have diameters which vary continuously or discontinuously in the direction of its thickness and the diameters of them on one side of the membrane differ from those on the other side of it.

The symmetric membrane, as explained in Japanese Patent Publication (OPI) No. 154051/80, gives a great resistance to the flow of a fluid on its filtration so that the flow rate is low (that is, only a low flow rate is obtainable per unit area, unit period of time and unit pressure differance). Also, the filtration ability of the membrane can not last long since its pores tend to be blocked easily, i.e., no anti-blocking ability.

On the other hand, the asymmetric membrane has on its surface a fine layer which contains pores of the shortest diameters, whereby fine particles of a minimum size can be substantially caught and removed here on filtration. This means that all the thickness of the membrane can be efficiently utilized as a filter so that it is possible to increase the filtration flow rate as well as to prolong the life of the membrane as a filter, when it is used with care.

In the above case, however, since the fine layer which is very important is on the surface of the membrane, it tended to get scratched or abraded, often resulting in an escape of fine particles.

To solve this problem, the fine layer having micropores of the shortest diameters is desired to be inside a membrane for filtration. For example, Japanese Patent Publication (OPI) No. 150402/83 proposes a structure in which two asymmetric membranes are adjusted together in layers in such a manner as their fine layer's sides come in contact. However, in such a filter of layered asymmetric membranes, when it is folded in an accordion fold and placed in a cartridge, the filtration area within the cartridge becomes small and therfore, the filtration flow rate as a module gets low. Accordingly, it has been strongly desired in this industry to invent a structure which has said fine layer inside a single membrane.

In order to overcome the above problem, the present inventors studied in detail one of the traditional methods for producing micro-porous membranes, i.e., a dry-wet method, in which a polymer solution is spread and allowed to stand in air for a certain period of time to cause a micro-phase separation whereby the diameter of the micro-pores is controlled. Such method was divided into two types, e.g., the one is a method to let the solvent used evaporate thoroughly (e.g., Japanese Patent Publication (OPI) No. 102416/80) and the other is a method in which the spread polymer solution is hardly left to let the solvent evaporate and is immersed in a solidifying bath (e.g., Japanese Patent Publication (OPI) Nos. 8887/80 & 154051/81).

Differently from these two methods, the present inventors discovered that, surprisingly enough, a layer of minimum pores can be formed at a certain depth inside a micro-porous membrane when evaporation of the solvent from the spread polymer solution is suitably controlled, while a highly accurately adjusted amount of vaper of a non-solvent to the polymer is given to said spread solution from the air so as to let the solution absorb the vaper through its spread surface, whereby a micro-phase separation is caused to occur to a certain depth below the surface of the spread solution.

SUMMARY OF THE INVENTION

Thus, the first object of the present invention is to provide a micro-porous membrane which has a small filtration resistance and a high filtration flow rate.

The second object is to provide a micro-porous membrane of which filtration ability will not easily deteriorate due to any damage on its surface.

The above-mentioned objects of the present invention have been accomplished by a micro-porous membrane which is characterized by having a distribution of micro-pore diameters in the direction of the thickness and containing a layer of minimum pore inside the membrane (hereinafter referred to as both sides asymmetric membrane).

Since the micro-porous membrane of the present invention has a pore diameter distribution in the direction of its thickness, the whole body of the membrane can be effectively used as a filter. Accordingly, the filtration flow rate can be increased and the life as a filter is prolonged. Moreover, as the layer of minimum pores exists not on the surface of the membrane but inside it, a risk of being damaged by scratches, etc. is minimized, which makes the membrane highly advantageous in its handling. Also, it can be used as a cartridge type filter just like an ordinary micro-porous membrane consisting of one sheet. Thus, the present invention is very significant.

BRIEF DESCRIPTION OF THE DRAWING

The FIGURE is an electron microscopic photograph of 1,500 magnifications, which shows a section of the micro-porous membrane obtained in Example 2 by blowing air for 4 seconds before immersing in a solidifying bath containing water at 20° C.

The polymer used to form a membrane in this invention is not particularly restricted. It can be chosen depending on the uses of such asymmetric porous membranes or other purposes. Examples of such a polymer are cellulose acetate, nitrocellulose, polysulfone, polyether sulfone, polyacrylonitrile, styrene-acrylonitrile copolymer, styrene-butadiene copolymer, saponified products of ethylene-vinyl acetate copolymer, polyvinyl alcohol, polycarbonate, organosiloxane-polycarbonate copolymer, polyester carbonate, organopolysiloxane, polyphenyleneoxide, polyester, polyamide, polyimide, polyvinylidene fluoride, polyvinyl acetate, polyamideimide, polybenzimidazole, etc.

The micro-porous membrane of the present invention is produced as follows: The above polymer is dissolved into (1) a good solvent, (2) a mixture of a good solvent and a non-solvent, or (3) a mixture of more than one of the solvents which have different solubilities with one another, to prepare a raw solution for a membrane. Then, the solution is spread over a support and immersed in a solidifying liquid to form a membrane, which is rinsed and dried.

The solvent used for a polymer to form a membrane depends on the kind of the polymer. Generally, it is to be a good solvent to said polymer and, at the same time, it is to be the one which can be quickly substituted by a solidifying liquid on immersion. In many cases, water is used as a solidifying liquid. Therefore, it is preferable to use a polar solvent which has a compatibility with water. For example, when polysulfone is used as a polymer for forming a membrane, dioxane, tetrahydrofuran, dimethylformamide, dimethylacetamide, N-methyl-2-pyrrolidone or a mixture of them are suitable. In the case of using polyacrylonitrile, solvents such as dioxane, N-methyl-2-pyrrolidone, dimethylformamide, dimethylacetamide, dimethylsulfoxide, etc. are suitable. Also, dimethylformamide, dimethylacetamide, etc. in the case of polyamide; and dichloroethane, acetone, dioxane, tetrahydrofuran, N-methyl-2-pyrrolidone, etc. in the case of cellulose acetate are suitable respectively.

On the other hand, a preferable non-solvent is the solvent which does not dissolve a polymer and, at the same time, has a sufficient compatibility with a solidifying liquid. Examples of such a non-solvent are water, methanol, isopropanol, polyethylene glycol, glycerin, etc. When this non-solvent is mixed with a good solvent, the amount of the former is not restricted so far as it is within a range where the resultant mixture solution can maintain its homogeneity. However, preferable a amount of the non-solvent is 5–50% by weight.

Also, in order to control the porous structure, a swelling agent such as an inorganic or organic electrolyte, or a macromolecule or its electrolyte can be added to the polymer solution.

Examples of such a swelling agent are metal salts of inorganic acids such as sodium chloride, sodium nitrate, potassium nitrate, sodium sulfate, zinc chloride, etc.; metal salts of organic acids such as sodium acetate, sodium formate, etc.; macromolecules or their electrolytes such as polyethylene glycol, poly(vinyl-pyrrolidone), poly(vinyl alcohol) carboxymethyl cellulose, polystyrene sodium sulfonate, poly(vinyl-benzyl-trimethyl ammonium chloride), etc.; and ionic surface active agents such as di-octylsulfo sodium succinate, alkyl methyl sodium taurinate, etc. These swelling agents give their effects to some extent even when they are added as they are to a polymer solution. However, when they are added in a form of as aqueous solution, they sometimes show remarkable effects. Although there is no restriction to the amount of the swelling agent to be added so far as the homogeneity of the polymer solution is maintained, it is usually 0.5–50% by weight to the solvent.

The concentration of the polymer solution for forming a membrane is to be 5–35% by weight, preferably 10–30% by weight. If the concentration is higher than 35% by weight, the water permeability of the obtained micro-porous membrane becomes so low as to be impractical, while the concentration lower than 5% by weight does not provide a membrane having a sufficient filtration ability.

The micro-porous membrane of the present invention can be produced by forcing a polymer solution out from a slit to have a certain thickness over a suitable support, and immersing the spread solution in a solidifying liquid at the time when a micro-phase separation occurred only at around the place near the surface of the spread solution, the separation being caused by the solvent evaporation and absorption of non-solvent vapor into the surface of the spread solution.

The reason why the micro-porous membrane having the layer of minimum pores inside can be obtained by the present invention is not known clearly. However, it is presumed to be as follows: A layer of minimum pores seems to be formed in between the layer in which said micro-phase separation due to the solvent evaporation and the non-solvent's penetration occured and that in which no such separation took place. When the membrane is immersed in a solidifying liquid before the diameters of the pores in said layer grow, the layer of minimum pores can be fixed. Then, since the solidifying liquid permeates very slowly through said minimum pore layer to the inner part of the spread solution, the micro-phase separation due to the penetration of the non-solvent proceeds in the part beyond the layer of minimum pores, whereby micro-pores having larger diameters than that of the pores in the minimum pore layer are formed.

In the traditional methods, in order to let pores form in the surface area of a membrane which is used in a field of micro-filtraion, the raw solution for forming a membrane is spread over a support after the solution has slightly developed its phase separation, and the spread solution is immersed in a solidifying liquid (e.g., Japanese Patent Publication (OPI) Nos. 154051/81 & 145740/83).

However, the weakest point of such methods is that the stability of the raw solution in the state of such phase separation is very poor so that the solution should be formed into a membrane within a short period of time after the preparation of the solution in said state, otherwise precipitates are formed in the solution and a further filtration process becomes necessary as disclosed in a bulletin of Japanese Patent Publication (OPI) No. 145740/83. On the other hand, if the development of the phase separation is suppressed to secure the stability of the raw solution, a skin layer is formed on the surface of the membrane, which makes it unsuitable as a filter for microfiltration. The present invention, however, does not suffer from such a problem, since a raw solution is prepared to be a completely homogeneous system, and after it is spread the spread solution is immersed in a solidifying bath when a vaper of a non-solvent (e.g., water) is supplied from the air to let the spread solution absorb it while the solvent in the solution is evaporated to cause a state of phase separation only in the area near the surface.

According to the present invention, both side asymmetric membrane which has not been obtainable so far can be produced by controlling the amount of the non-solvent contained in the gas which is in contact with the surface of the spread solution as well as the blowing rate of the gas toward said surface. In this case, since the phase separation is caused to occur only in the area near the surface, it is necessary to let the non-solvent vapor be absorbed into the spread solution uniformly within a very short time and the solution be solidified immediately. By adjusting this absorption of the non-solvent vapor, it is possible to adjust the depth of the minimum pore layer and the diameter of the pores in it.

The diameter of the pores on the top side of the obtained membrane and that on the other side is in the ratio of 1:10–1:100 and the specific surface area measured by BET method reaches 8–80 $m^2/g$ so that the membrane has a high filtration flow rate and an extremely long life.

In order to make the present invention effective, it is especially necessary to previously add to a raw solution not only a solvent suitable for the polymer used but also a non-solvent and a swelling agent. Examples of such a non-solvent and a swelling agent are polyethylene glycol, poly(vinylpyrrolidone), water, etc. as mentioned before.

The conditions for producing the present micro-porous membrane depend on the kind of the polymer, solvent, non-solvent and swelling agent to be used, the concentration of the polymer, the atmosphere in which the raw solution is spread, etc. It is important to find out the most desirable conditions by studying the timing of the micro-phase separation and the structure of the membrane. The thus obtained conditions can be controlled by adjusting the amount of the solvent evaporating from the spread raw solution and the amount of the non-solvent vaper absorbed by it according to various methods.

Such an adjustment can be accomplished, for example, by adjusting the period of time from spreading of the raw solution to immersion of it in a solidifying bath. This time adjustment is carried out e.g., by covering the course of the polymer solution from the place where it is spread to that of the solidifying bath; or by adjusting the vapor pressures of the good solvent and non-solvent, temperature, rate of aeration, etc. in the atmosphere where the present process is carried out.

For example, in the case of forming a micro-porous membrane using polysulfone, the raw solution is spread over a support and the air having an absolute humidity of more than 2 g $H_2O$/Kg. Air is blown to the surface of the spread solution at a rate of higher than 0.2 m/sec, whereby a coacervation phase is formed to deeper than 1 $\mu$m, preferably as deep as 1–30 $\mu$m below the surface of the spread solution. Then the resulting membrane is immediately immersed in a solidifying bath to form a micro-porous membrane.

The present invention is characterized by forming a coacervation phase only in the surface layer after the raw solution is spread. Therefore, it is different from the method described in Japanese Patent Publication (OPI) No. 154051/81 in which a raw solution is made in a state of a phase separation before it is spread. The membrane obtained according to the present invention has a layer of minimum pores inside it, whereas the one obtained in said patent application (OPI) has such a layer in its surface.

The polymer solution removed from the solidifying liquid has acquired a self-supporting ability. Thus, it is peeled off from the support used for reinforcement and immersed in a rinsing bath. After rinsing the membrane with water, it is dried and either rolled up or further treated to make it hydrophilic.

EXAMPLES

While the present invention is further explained in details with reference to examples thereof, it is not to be restricted by them.

EXAMPLE 1

A homogeneous raw solution for forming a membrane was prepared by dissolving 20 parts of polyvinylidene fluoride (KYNAR ®: manufactured by Penwalt Co., Ltd. U.S.A.), 60 parts of dimethylacetamide as a good solvent, and a non-solvent consisting of 10 parts of polyethylene glycol 200, 10 parts of poly(vinylpyrrolidone) and 0.7 parts of water. The obtained solution was spread evenly over a glass plate using a doctor blade so as to have a spread solution thickness of 150 $\mu$m, and warm air at 60° C. (relative humidity: 30%) was blown to the surface of the spread solution samples at a rate of 0.8 m/sec for 0, 2, 6, 10 & 30 seconds, respectively. Then, the samples were immediately immersed in warm water at 60° C. for 2 minutes and further in water at 20° C. to obtain micro-porous membranes. The structure of each membrane was examined by an electron microscope. The results are shown in the table below.

As apparent from the above results, it is proved that the minimum pore layer was formed inside the membrane when warm air was blown for 2 to less than 30 seconds.

EXAMPLE 2

A raw solution for forming a membrane was prepared by homogeneously dissolving 15 parts of polysulfone (P-3500 manufactured by U.C.C. Co.), 70 parts of N-methyl-2-pyrrolidone, 15 parts of poly(vinylpyrrolidone) and 0.8 parts of water. The solution was let flow to spread over a glass plate with a casting coater so as to have a spread solution thickness of 150 $\mu$m, and warm air at 40° C. (relative humidity: 60%) was blown to the surface of the spread solution samples at a rate of 2 m/sec for 2, 4, 6, 10, 20 & 30 seconds, respectively. The samples were immediately immersed in a solidifying bath containing water at 20° C. to obtain micro-porous membranes. The membranes which had a minimum pore layer inside them were those blown with the above air for 2 to less than 30 seconds. The one blown for 30 seconds did not have such a layer.

From the electron microscopic photograph of the section of the membrane (see the FIGURE) which was left stand in the air for 4 seconds, a fine layer of which micro-pore diameters were shorter than those of the pores on the membrane surface was found to be at the depth of about 10 $\mu$m below the surface.

| Period of Time for Blowing Warm Air | Diameter of the Pores on the Surface | Depth from the Surface to the Minimum Pore Layer | Diameter of the Pores on the Back Side | Thickness of the Membrane |
| --- | --- | --- | --- | --- |
| 0 sec. | 0.05 μm | Surface | 1 μm | 100 μm |
| 2 sec. | 0.08 μm | 2 μm | 2.5 μm | 114 μm |
| 6 sec. | 0.15 μm | 10 μm | 10 μm | 103 μm |
| 10 sec. | 0.80 μm | 25 μm | 10 μm | 115 μm |
| 30 sec. | 1.2 μm | not obvious | 20 μm | 110 μm |

What is claimed is:

1. A micro-porous polysulfone membrane produced by spreading a polymer solution over a support and then, after a phase separation has occurred in the polymer solution, immersing the polymer solution in a solidifying liquid, the membrane consisting essentially of a homogeneous polysulfone polymer material having a front surface and a back surface and having a distribution of pore diameters in the direction of the thickness of the membrane, which is characterized by containing a layer of minimum pores inside the membrane between the front surface and back surface.

2. A micro-porous polysulfone membrane as claimed in claim 1, wherein the diameters of pores at the front surface of said membrane is less than the diameters of the pores at the back surface of said membrane and the layer of minimum pores exists at a depth of 1–30 μm below the front surface of the membrane.

3. In a process for producing a micro-porous membrane having a front surface and a back surface, wherein a polymer solution is prepared by (i) dissolving a polymer for forming a membrane in a mixture of a good solvent for said polymer, (ii) spreading a non-solvent for said polymer over a support, and then (iii) immersing the polymer solution in a solidifying liquid to form a micro-porous membrane, the improved process wherein the step of immersing the polymer solution in a solidifying liquid is carried out after causing a phase separation on the surface of the spread solution, and wherein air of which absolute humidity is higher than 2 g $H_2O$/Kg. Air is blown to the surface of the membrane of said polymer solution at a rate of 0.2 m/sec or higher, to obtain a micro-porous membrane having a layer of minimum pores inside the membrane between the front surface and back surface.

4. A process for producing a micro-porous membrane having a layer of minimum pores inside as claimed in claim 3, wherein water is used as a solidifying liquid and a polar solvent compatible with water is used as a good solvent for said polymer.

5. A micro-porous membrane having a distribution of pore diameters in the direction of the thickness of the membrane made by preparing a polymer solution by dissolving a polymer for forming a membrane in a mixture of a good solvent for said polymer and a non-solvent for the same polymer, spreading the polymer solution over a support and then immersing the spread solution in a solidifying liquid to form a micro-porous membrane, wherein said immersing in a solidifying liquid is carried out after causing phase separation on the surface of the spread solution to obtain a micro-porous membrane having a layer of minimum pores inside.

6. A micro-porous membrane claimed in claim 5 or claim 2, wherein said membrane is a polysulfone membrane.

* * * * *